United States Patent
Wu et al.

(10) Patent No.: US 9,036,385 B2
(45) Date of Patent: May 19, 2015

(54) POWER SUPPLY, POWER MANAGEMENT DEVICE APPLIED TO A POWER SUPPLY, AND METHOD FOR PERFORMING BROWN-OUT PROTECTION AND OVERHEAT PROTECTION OF A POWER MANAGEMENT DEVICE

(71) Applicant: Leadtrend Technology Corp., Hsin-Chu (TW)

(72) Inventors: Chin-Ho Wu, Hsin-Chu (TW); Ren-Yi Chen, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 243 days.

(21) Appl. No.: 13/632,147

(22) Filed: Sep. 30, 2012

(65) Prior Publication Data
US 2013/0083562 A1    Apr. 4, 2013

(30) Foreign Application Priority Data

Oct. 3, 2011    (TW) .............................. 100135732 A

(51) Int. Cl.
| | | |
|---|---|---|
| H02H 7/122 | (2006.01) | |
| H02M 1/32 | (2007.01) | |
| H02M 3/335 | (2006.01) | |
| H02M 7/217 | (2006.01) | |

(52) U.S. Cl.
CPC ............ *H02M 1/32* (2013.01); *H02M 3/33507* (2013.01); *H02M 7/217* (2013.01); *H02M 2001/327* (2013.01)

(58) Field of Classification Search
USPC .............. 363/16, 17, 20, 21.04, 21.09, 21.12, 363/21.15, 21.16, 21.18, 56.01, 56.04, 97, 363/98, 56.09; 361/90, 91.1, 93.8, 103, 361/115; 323/282–288, 901; 327/513, 539, 327/494
See application file for complete search history.

(56) References Cited

U.S. PATENT DOCUMENTS

| | | | |
|---|---|---|---|
| 6,538,908 B2 * | 3/2003 | Balakrishnan et al. | 363/95 |
| 6,906,934 B2 * | 6/2005 | Yang et al. | 363/49 |
| 7,149,098 B1 * | 12/2006 | Chen | 363/56.09 |
| 7,215,525 B2 * | 5/2007 | Usui | 361/103 |
| RE39,933 E * | 12/2007 | Hall et al. | 363/21.13 |
| 7,339,359 B2 * | 3/2008 | Choi et al. | 323/284 |
| 7,511,929 B2 * | 3/2009 | Hachiya | 361/18 |
| 2006/0124557 A1 | 6/2006 | Wittmer | |
| 2007/0093928 A1 | 4/2007 | Forster | |

FOREIGN PATENT DOCUMENTS

| | | |
|---|---|---|
| CN | 101228685 A | 7/2008 |
| CN | 102005731 A | 4/2011 |
| TW | 200703870 | 1/2007 |

* cited by examiner

*Primary Examiner* — Rajnikant Patel
(74) *Attorney, Agent, or Firm* — Winston Hsu; Scott Margo

(57) ABSTRACT

A power supply can provide brown-out protection and overheat protection. The power supply includes a rectifier, a transformer, and a power management device. The rectifier is used for receiving an alternating current voltage. The alternating current voltage has a voltage cycle. The transformer coupled to the rectifier has an inductor coupled to a switch for supplying an output voltage. The power management device is used for controlling the switch to make the inductor save power or release power. The power management device has a multi-functional pin coupled to the rectifier for receiving a detection voltage corresponding to a positive half cycle of the alternating current voltage. The multi-functional pin is also coupled to a thermistor for receiving an overheat protection signal.

6 Claims, 3 Drawing Sheets

POWER SUPPLY, POWER MANAGEMENT DEVICE APPLIED TO A POWER SUPPLY, AND METHOD FOR PERFORMING BROWN-OUT PROTECTION AND OVERHEAT PROTECTION OF A POWER MANAGEMENT DEVICE

BACKGROUND OF THE INVENTION

1. Field of the Invention

The present invention relates to a power supply, a power management device applied to a power supply, and a method applied to a power management device, and particularly to a power supply, a power management device applied to a power supply, and a method applied to a power management device with both brown-out protection and overheat protection.

2. Description of the Prior Art

Many power products have a requirement for both brown-out protection and overheat protection. Because general power management integrated circuits (six-pin or high-voltage eight-pin series integrated circuits) are limited to an insufficient number of pins, and brown-out protection and a latch/auto-recovery function of overheat protection are not designed in to one power management integrated circuit simultaneously. Therefore, most common six-pin pulse width modulation integrated circuits only provide one pin for the latch/auto-recovery function, and a minority of power management integrated circuits only provide one pin for a single function (such as the brown-out protection).

The prior art executes the brown-out protection and the overheat protection separately, but detects the brown-out protection and the overheat protection simultaneously. When a voltage level of a pin of the brown-out protection is lower than a reference level corresponding to the brown-out protection, or a voltage level of a pin of the overheat protection is lower than a reference level corresponding to the overheat protection, a power management integrated circuit does not output pulse signals to an external switch again. Meanwhile, the power management integrated circuit is turned off to enter a sleep mode or a latch off mode. But, compared to the six-pin or the high-voltage eight-pin series power management integrated circuits, the power management integrated circuit has to include one additional pin. Therefore, the prior art can not execute the brown-out protection and the overheat protection simultaneously in the six-pin or the high voltage eight-pin series power management integrated circuits.

SUMMARY OF THE INVENTION

An embodiment provides a power supply. The power supply includes a rectifier, a transformer, and a power management device. The rectifier is used for receiving an alternating current voltage, where the alternating current voltage has voltage cycle. The transformer is coupled to the rectifier, where the transformer inductor is coupled to a switch for supplying an output voltage. The power management device is used for controlling the switch to make the inductor save power or release power, where the power management device has a multi-functional pin coupled to the rectifier for receiving a detection voltage corresponding to a positive half cycle of the alternating current voltage, and the multi-functional pin is further coupled to a thermistor for receiving an overheat protection signal.

Another embodiment provides a power management device applied to a power supply. The power management device includes a low voltage detection circuit and an overheat detection circuit. The low voltage detection circuit is coupled to a multi-functional pin of the power management device for comparing a detection voltage corresponding to a peak value of an alternating current voltage with a first reference voltage to output a first comparison signal when a voltage cycle of the alternating current voltage is a positive half cycle, wherein the power management device executes a brown-out protection according to the first comparison signal. The overheat detection circuit is coupled to the multi-functional pin for comparing an overheat protection signal with a second reference voltage to output a second comparison signal when the voltage cycle of the alternating current voltage is a negative half cycle, wherein the power management device executes an overheat protection according to the second comparison signal. The alternating current voltage received by the power supply has the voltage cycle.

Another embodiment provides a method for brown-out protection and overheat protection of a power management device, the power management device includes a multi-functional pin coupled to an alternating current voltage and a thermistor simultaneously, a low voltage detection circuit is coupled to the multi-functional pin, and an overheat detection circuit is coupled to the multi-functional pin. The method includes detecting a voltage cycle of the alternating current voltage; the low voltage detection circuit detecting and comparing a detection voltage corresponding to a positive half cycle of the voltage cycle of the alternating current voltage to make the power management device execute a brown-out protection when the voltage cycle of the alternating current voltage is the positive half cycle; and the overheat detection circuit detecting and comparing a overheat protection signal corresponding to a voltage drop of the thermistor to make the power management device execute an overheat protection when the voltage cycle of the alternating current voltage is a negative half cycle.

The present invention provides a power supply, a power management device applied to a power supply, and a method for performing brown-out protection and overheat protection of a power management device. The power supply, the power management device, and the method utilize a switching circuit included by the power management device to detect a voltage cycle of an alternating current voltage according to current flowing in a multi-functional pin of the power management device or reference current flowing out of the multi-functional pin of the power management device. When the voltage cycle of the alternating current voltage is at a positive half cycle, a low voltage detection circuit included by the power management device executes brown-out protection; when the voltage cycle of the alternating current voltage is at a negative half cycle, an overheat detection circuit executes overheat protection. Therefore, the present invention can execute the brown-out protection and the overheat protection in the present six-pin or high voltage eight-pin series integrated circuits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
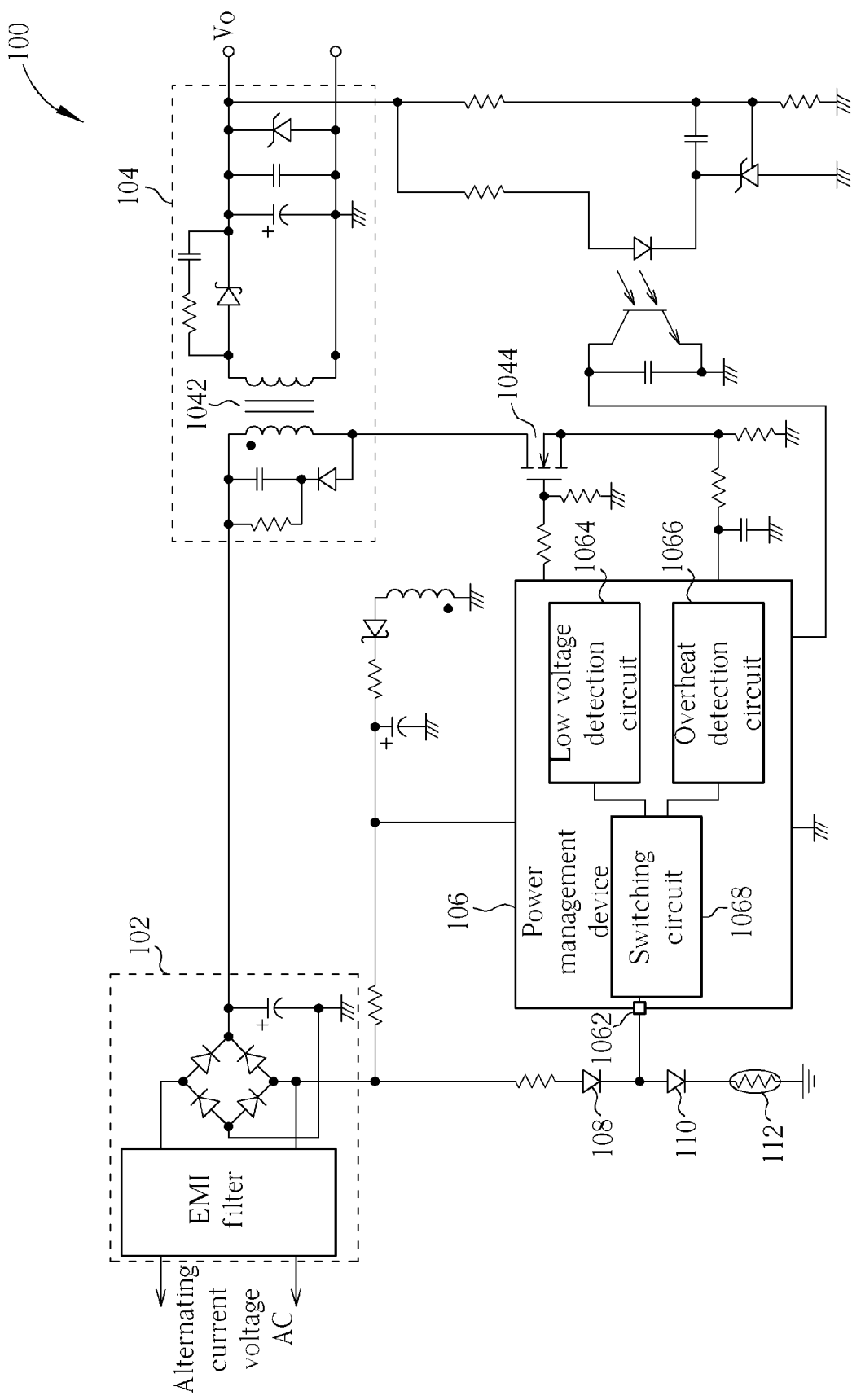
FIG. 1 is a diagram illustrating a power supply according to an embodiment.

Please refer to FIG. 1. FIG. 1 is a diagram illustrating a power supply 100 according to an embodiment. The power supply 100 includes a rectifier 102, a transformer 104, and a power management device 106. The rectifier 102 is used for receiving an alternating current voltage AC. The alternating current voltage AC has a voltage cycle. The transformer 104 is coupled to the rectifier 102 and has an inductor 1042 coupled to a switch 1044 for supplying an output voltage Vo. The power management device 106 is used for controlling the switch 1044 to make the inductor 1042 store power or release power. The power management device 106 has a multi-functional pin 1062 coupled to the rectifier 102 through a diode 108 for receiving a peak value Vp of the alternating current voltage AC. That is to say, the peak value Vp is a peak value of a positive half cycle of the alternating current voltage AC. The multi-functional pin is further coupled to a thermistor 112 through a diode 110 for receiving an overheat protection signal To, where when the power management device 106 detects the peak value Vp, current Ip corresponding to the peak value Vp flows in the power management device 106. When the alternating current voltage AC is at a negative half cycle, the power management device 106 is used for detecting the overheat protection signal To. Meanwhile, reference current IREF flows out of the power management device 106 through the thermistor 112 to ground. Therefore, the thermistor 112 generates the overheat protection signal To according to the reference current IREF flowing through the thermistor 112. A resistance of the thermistor 112 varies with a temperature of the thermistor 112, so the thermistor 112 is different from a general fixed resistor. In addition, the power management device 106 includes a low voltage detection circuit 1064, an overheat detection circuit 1066, and a switching circuit 1068. The switching circuit 1068 is coupled to the multi-functional pin 1062 for detecting the current Ip flowing in the multi-functional pin 1062 or the reference current IREF flowing out of the multi-functional pin 1062 to determine the voltage cycle of the alternating current voltage AC, where the low voltage detection circuit 1064 or the overheat detection circuit 1066 is coupled to the multi-functional pin 1062 through the switching circuit 1068.

When the voltage cycle of the alternating current voltage AC is at the positive half cycle, the current Ip flowing in the multi-functional pin 1062 is larger than 0 A. Meanwhile, the switching circuit 1068 receives the current Ip and makes the low voltage detection circuit 1064 be coupled to the multi-functional pin 1062. Then, the low voltage detection circuit 1064 starts to sample the current Ip, where time for the low voltage detection circuit 1064 sampling the current Ip is about half of the positive half cycle. When the voltage cycle of the alternating current voltage AC is at the positive half cycle, the current Ip flows in the multi-functional pin 1062, so the diode 108 is not necessary. That is to say, the multi-functional pin 1062 can also be coupled to the rectifier 102 not through the diode 108. In addition, the current Ip has amplitude within a very small range (such as 8 uA to 40 uA, but the present invention is not limited to 8 uA to 40 uA) to reduce power loss when the voltage cycle of the alternating current voltage AC is at the positive half cycle. In addition, the current Ip corresponds to the peak value Vp, so a voltage level of the alternating current voltage AC can be determined according to the current Ip when the voltage cycle of the alternating current voltage AC is at the positive half cycle. The current Ip can be converted into a detection voltage VT through the switching circuit 1068, then the low voltage detection circuit 1064 compares the detection voltage VT with a first reference voltage VREF1. When the detection voltage VT is lower than the first reference voltage VREF1, the low voltage detection circuit 1064 can output a first comparison signal C1, so the power management device 106 executes brown-out protection according to the first comparison signal C1, where the first reference voltage VREF1 is about 0.2V to 0.3V.

When the voltage cycle of the alternating current voltage AC is at the negative half cycle, the current Ip flowing in the multi-functional pin 1062 is roughly equal to zero or smaller than zero. Meanwhile, the switching circuit 1068 makes the overheat detection circuit 1066 be coupled to the multi-functional pin 1062. Then, the reference current IREF within the power management device 106 can pass the multi-functional pin 1062 to flow through the thermistor 112 to generate the overheat protection signal To. Then, the overheat detection circuit 1066 can receive the overheat protection signal To. The overheat detection circuit 1066 compares the overheat protection signal To with a second reference voltage VREF2. When the overheat protection signal To is larger than the second reference voltage VREF2, the overheat detection circuit 1066 can output a second comparison signal C2, so the power management device 106 executes overheat protection according to the second comparison signal C2, where the second reference voltage VREF2 is about 2.05V to 1.95V. When the voltage cycle of the alternating current voltage AC is at the negative half cycle, the reference current IREF can pass the multi-functional pin 1062 to flow through the thermistor 112, so the diode 110 is not necessary. That is to say, the multi-functional pin 1062 can also be coupled to the thermistor 112 not through the diode 110.

After the power management device 106 determines the overheat protection (that is, after the negative half cycle of the voltage cycle of the alternating current voltage is completed, and the positive half cycle of the voltage cycle of the alternating current voltage AC starts again), the switching circuit 1068 has to detect the current Ip flowing in the multi-functional pin 1062 or the reference current IREF flowing out of the multi-functional pin 1062 again to detect the voltage cycle of the alternating current voltage. Thus, the present invention can execute the brown-out protection and the overheat protection.

Figure 2:
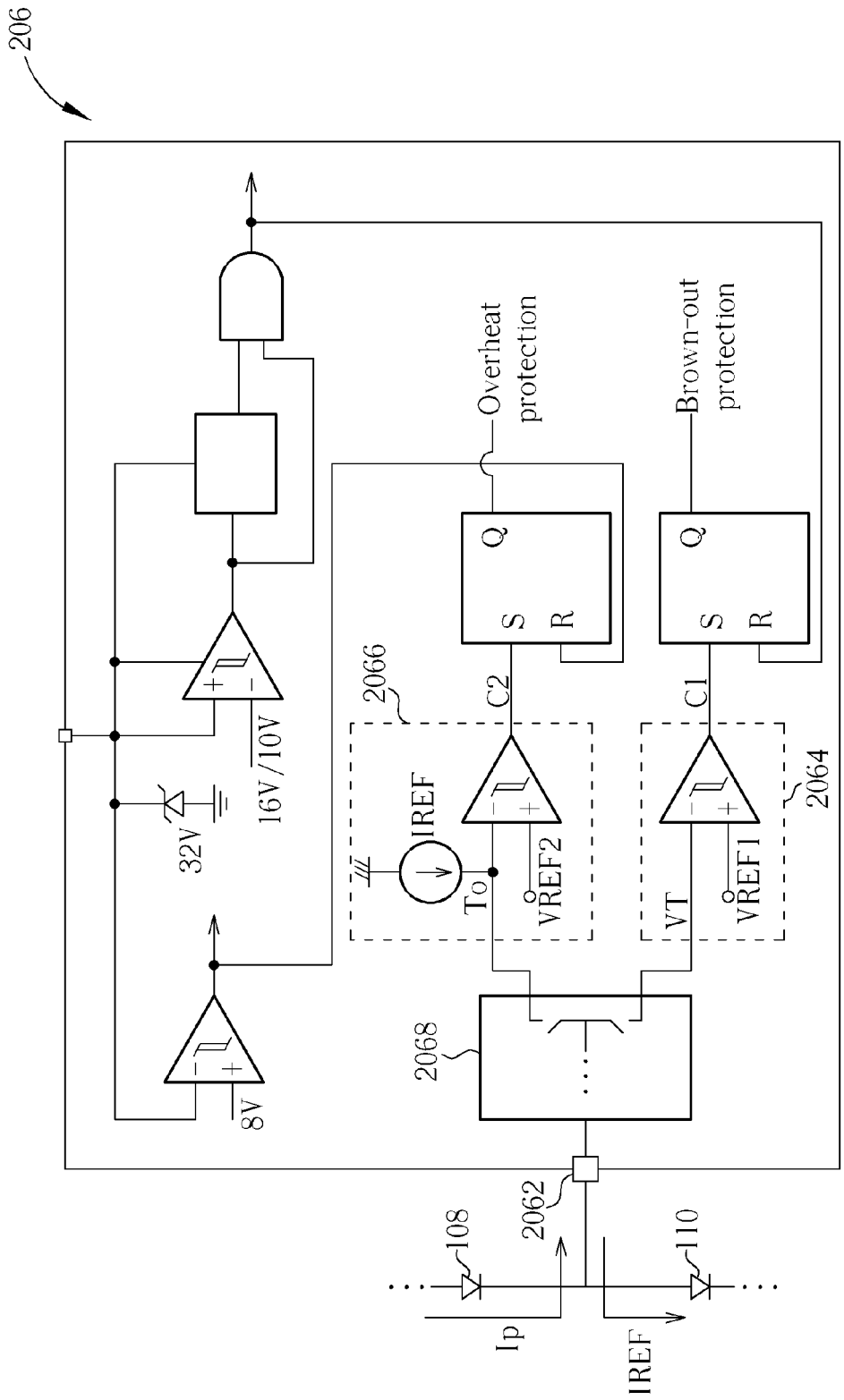
FIG. 2 is a diagram illustrating a management device of the power supply according to another embodiment.

Please refer to FIG. 2. FIG. 2 is a diagram illustrating a management device 206 of the power supply 100 according to another embodiment. The power management device 206 includes a low voltage detection circuit 2064, an overheat detection circuit 2066, and a switching circuit 2068. The switching circuit 2068 is coupled to a multi-functional pin 2062 of the power management device 206 for detecting the current Ip flowing in the multi-functional pin 2062 or the reference current IREF flowing out of the multi-functional pin 2062 to detect the voltage cycle of the alternating current voltage. When the voltage cycle of the alternating current voltage AC is at the positive half cycle (the current Ip is larger than 0 A), the switching circuit 2068 makes the low voltage detection circuit 2064 be coupled to the multi-functional pin 2062. Meanwhile, the low voltage detection circuit 2064 compares the detection voltage VT corresponding to the peak value Vp of the alternating current voltage AC with the first reference voltage VREF1 to output the first comparison signal C1. Then, the power management device 206 executes the brown-out protection according to the first comparison signal C1. When the voltage cycle of the alternating current voltage AC is at the negative half cycle (the current Ip is roughly equal to zero or smaller than zero), the switching circuit 2068 makes the overheat detection circuit 2066 be coupled to the multi-functional pin 2062. Meanwhile, the overheat detection circuit 2066 compares the overheat protection signal To with the second reference voltage VREF2 to output the second comparison signal C2. Then, the power management device 206 executes the overheat protection according to the second comparison signal C2. Further, subsequent operational principles of the power management device 206 are the same as those of the power management device 106, so further description thereof is omitted for simplicity.

Figure 3:
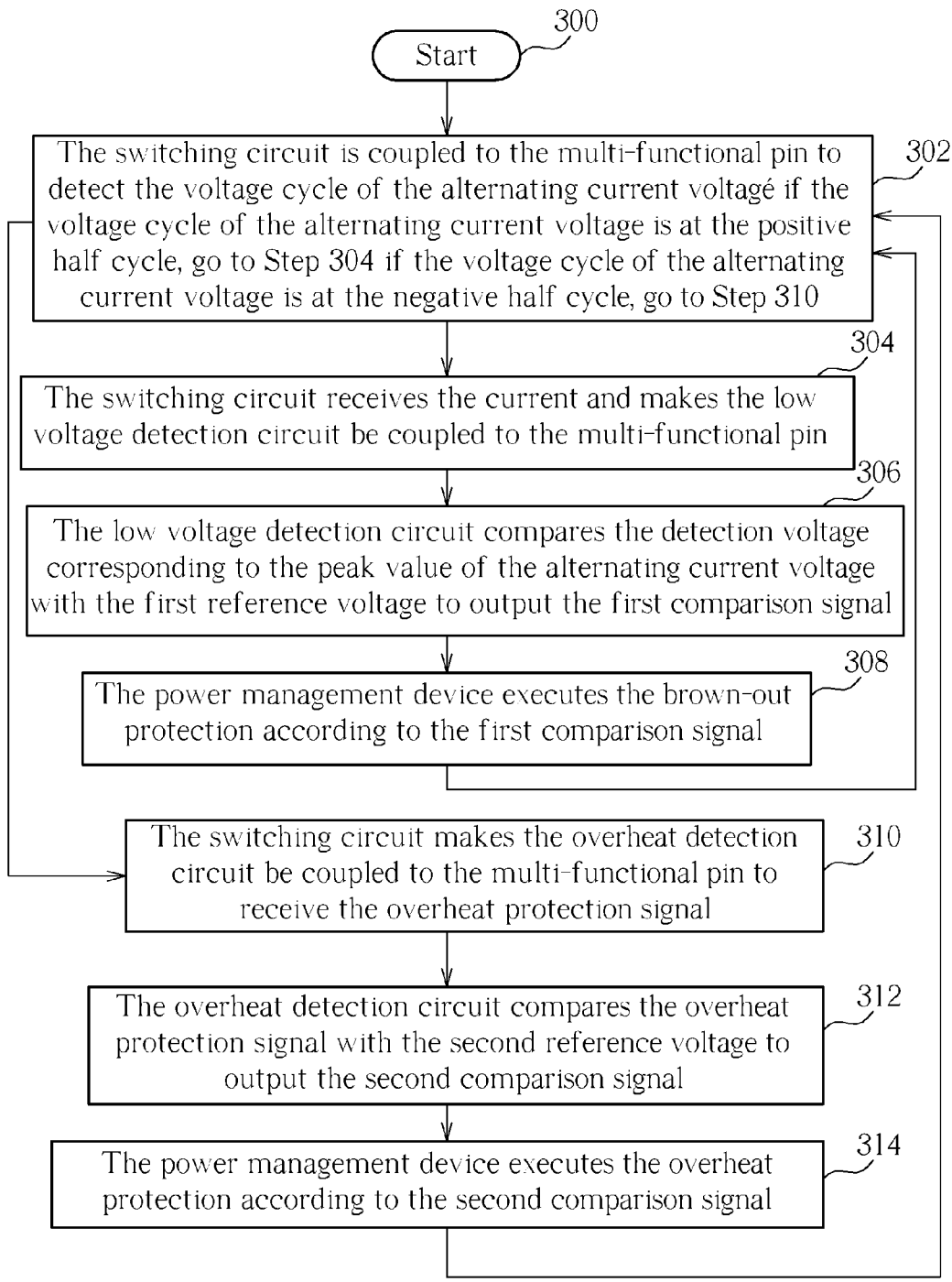
FIG. 3 is a flowchart illustrating a method for brown-out protection and overheat protection of a power management device according to another embodiment.

Please refer to FIG. 3. FIG. 3 is a flowchart illustrating a method for brown-out protection and overheat protection of a power management device according to another embodiment. The method in FIG. 3 is illustrated using the power supply 100 in FIG. 1, where the multi-functional pin 1062 of the power management device 106 is coupled to an alternating current power supply which can provide the alternating current voltage AC, and coupled to the thermistor 112 simultaneously. Detailed steps are as follows:

Step 300: Start.

Step 302: The switching circuit 1068 is coupled to the multi-functional pin 1062 to detect the voltage cycle of the alternating current voltage; if the voltage cycle of the alternating current voltage is at the positive half cycle, go to Step 304; if the voltage cycle of the alternating current voltage is at the negative half cycle, go to Step 310.

Step 304: The switching circuit 1068 receives the current Ip and makes the low voltage detection circuit 1064 be coupled to the multi-functional pin 1062.

Step 306: The low voltage detection circuit 1064 compares the detection voltage VT corresponding to the peak value Vp of the alternating current voltage AC with the first reference voltage VREF1 to output the first comparison signal C1.

Step 308: The power management device 106 executes the brown-out protection according to the first comparison signal C1; go to Step 302.

Step 310: The switching circuit 1068 makes the overheat detection circuit 1066 be coupled to the multi-functional pin 1062 to receive the overheat protection signal To.

Step 312: The overheat detection circuit 1066 compares the overheat protection signal To with the second reference voltage VREF2 to output the second comparison signal C2.

Step 314: The power management device 106 executes the overheat protection according to the second comparison signal C2; go to Step 302.

In Step 302, the switching circuit 1068 is coupled to the multi-functional pin 1062 to detect the voltage cycle of the alternating current voltage AC. When the current Ip is larger than 0 A, the voltage cycle of the alternating current voltage AC is at the positive half cycle; when the current Ip is roughly equal to zero or smaller than zero, the voltage cycle of the alternating current voltage AC is at the negative half cycle. In Step 304, the switching circuit 1068 makes the low voltage detection circuit 1064 be coupled to the multi-functional pin 1062. Meanwhile, the current Ip flows in the switching circuit 1068 through the multi-functional pin 2062 to generate the detection voltage VT. In Step 306, when the detection voltage VT is lower than the first reference voltage VREF1, the low voltage detection circuit 1064 can output the first comparison signal C1. In Step 310, the switching circuit 1068 makes the overheat detection circuit 1066 be coupled to the multi-functional pin 1062. Meanwhile, the reference current IREF within the power management device 106 can pass the multi-functional pin 1062 to flow through the thermistor 112 to generate the overheat protection signal To. Then, the overheat detection circuit 1066 can receive the overheat protection signal To. In Step 312, when the overheat protection signal To is larger than the second reference voltage VREF2, the overheat detection circuit 1066 can output the second comparison signal C2.

To sum up, the power supply, the power management device applied to the power supply, and the method for performing the brown-out protection and the overheat protection of the power management device utilize the switching circuit included by the power management device to detect the voltage cycle of the alternating current voltage according to the current flowing in the multi-functional pin of the power management device or the reference current flowing out of the multi-functional pin of the power management device. When the voltage cycle of the alternating current voltage is at the positive half cycle, the low voltage detection circuit included by the power management device executes the brown-out protection; when the voltage cycle of the alternating current voltage is at the negative half cycle, the overheat detection circuit executes the overheat protection. Therefore, the present invention can execute the brown-out protection and the overheat protection in the present six-pin or high-voltage eight-pin series integrated circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply, comprising:
   a rectifier for receiving an alternating current voltage, wherein the alternating current voltage has a voltage cycle;
   a transformer coupled to the rectifier, the transformer having an inductor coupled to a switch for supplying an output voltage; and
   a power management device for controlling the switch to make the inductor save power or release power, wherein the power management device has a multi-functional pin coupled to the rectifier for receiving a detection voltage corresponding to a positive half cycle of the alternating current voltage, and the multi-functional pin is further coupled to a thermistor for receiving an overheat protection signal, wherein the power management device comprises:
      a low voltage detection circuit coupled to the multi-functional pin for comparing the detection voltage with a first reference voltage to output a first comparison signal when the voltage cycle of the alternating current voltage is the positive half cycle, wherein the power management device executes a brown-out protection according to the first comparison signal;
      an overheat detection circuit coupled to the multi-functional pin for comparing the overheat protection signal with a second reference voltage to output a second comparison signal when the voltage cycle of the alternating current voltage is a negative half cycle, wherein the power management device executes an overheat protection according to the second comparison signal and the second reference voltage is not fixed; and
      a switching circuit coupled to the multi-functional pin for detecting a current signal flowing in the multi-functional pin to determine the voltage cycle of the alternating current voltage, wherein the switching circuit switches the low voltage detection circuit to couple to the multi-functional pin for receiving a peak value of the alternating current voltage when the current signal is larger than zero, and switches the overheat detection circuit to couple to the multi-functional pin for receiving the overheat protection signal when the current signal is roughly equal to zero or smaller than zero.

2. The power supply of claim 1, wherein the multi-functional pin is coupled to the rectifier through a diode.

3. The power supply of claim 1, wherein the multi-functional pin is coupled to the thermistor through a diode.

4. A power management device applied to a power supply, the power management device comprising:
  a low voltage detection circuit coupled to a multi-functional pin of the power management device for comparing a detection voltage corresponding to a peak value of an alternating current voltage with a first reference voltage to output a first comparison signal when a voltage cycle of the alternating current voltage is a positive half cycle, wherein the power management device executes a brown-out protection according to the first comparison signal, wherein the alternating current voltage received by the power supply has the voltage cycle;
  an overheat detection circuit coupled to the multi-functional pin for comparing an overheat protection signal with a second reference voltage to output a second comparison signal when the voltage cycle of the alternating current voltage is a negative half cycle, wherein the power management device executes an overheat protection according to the second comparison signal; and
  a switching circuit coupled to the multi-functional pin for detecting a current signal flowing in the multi-functional pin to determine the voltage cycle;
  wherein the switching circuit switches the low voltage detection circuit to couple to the multi-functional pin for receiving the peak value of the alternating current voltage when the current signal is larger than zero, and switches the overheat detection circuit to couple to the multi-functional pin for receiving the overheat protection signal when the current signal is roughly equal to zero or smaller than zero.

5. A method for performing brown-out protection and overheat protection of a power management device, the power management device comprising a multi-functional pin coupled to an alternating current voltage and a thermistor simultaneously, a low voltage detection circuit coupled to the multi-functional pin, and an overheat detection circuit coupled to the multi-functional pin, the method comprising:
  detecting a voltage cycle of the alternating current voltage;
  the low voltage detection circuit detecting and comparing a detection voltage corresponding to a positive half cycle of the voltage cycle of the alternating current voltage to make the power management device execute a brown-out protection when the voltage cycle of the alternating current voltage is the positive half cycle; and
  the overheat detection circuit detecting and comparing an overheat protection signal corresponding to a voltage drop of the thermistor to make the power management device execute an overheat protection when the voltage cycle of the alternating current voltage is a negative half cycle.

6. The method of claim 5, wherein a current signal is larger than zero during the positive half cycle, and the current signal is roughly equal to zero or smaller than zero during the negative half cycle.

* * * * *